United States Patent
Hofmann et al.

(10) Patent No.: US 10,204,429 B2
(45) Date of Patent: Feb. 12, 2019

(54) METHOD AND APPARATUS FOR DEPICTION OF MEDICAL IMAGE DATA

(71) Applicant: Siemens Healthcare GmbH, Erlangen (DE)

(72) Inventors: Christian Hofmann, Erlangen (DE); Nora Huenemohr, Stuttgart (DE); Javier Pena, Erlangen (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/479,562

(22) Filed: Apr. 5, 2017

(65) Prior Publication Data

US 2017/0294035 A1  Oct. 12, 2017

(30) Foreign Application Priority Data

Apr. 6, 2016  (DE) .................. 10 2016 205 718

(51) Int. Cl.
| | |
|---|---|
| *G06K 9/00* | (2006.01) |
| *G06K 9/62* | (2006.01) |
| *G06T 7/00* | (2017.01) |
| *G06T 11/00* | (2006.01) |

(52) U.S. Cl.
CPC .......... *G06T 11/008* (2013.01); *G06K 9/0053* (2013.01); *G06K 9/0055* (2013.01); *G06K 9/6202* (2013.01); *G06T 7/0012* (2013.01); *G06K 2209/03* (2013.01); *G06T 2207/10081* (2013.01); *G06T 2211/40* (2013.01)

(58) Field of Classification Search
CPC ................ G06T 11/008; G06T 7/0012; G06T 2207/10081; G06T 2211/40; G06K 9/0053; G06K 9/0055; G06K 9/6202; G06K 2209/03

See application file for complete search history.

(56) References Cited

U.S. PATENT DOCUMENTS

| | | | |
|---|---|---|---|
| 4,855,910 A | | 8/1989 | Bohning |
| 5,271,055 A | * | 12/1993 | Hsieh .................. A61B 5/1135 378/8 |
| 2006/0224062 A1 | | 10/2006 | Aggarwal et al. |
| 2007/0286331 A1 | | 12/2007 | Keall et al. |
| 2008/0058963 A1 | * | 3/2008 | Garibaldi .............. G16H 40/63 700/19 |
| 2014/0119501 A1 | * | 5/2014 | O'Hare ................ G01N 23/046 378/19 |
| 2014/0142395 A1 | | 5/2014 | Sattler et al. |

(Continued)

OTHER PUBLICATIONS

Yamamoto et al.: "Retrospective Analysis of Artifacts in Four-Dimensional CT Images of 50 Abdominal and Thoracic Radiotherapy Patients",: International Journal of Radiation Oncology Biology Physics, vol. 72, No. 4, 15 pp. 1250-1258, (2008).

*Primary Examiner* — Brenda C Bernadi
(74) *Attorney, Agent, or Firm* — Schiff Hardin LLP (57) ABSTRACT

In a method and medical imaging apparatus for depiction of medical imaging data, medical imaging data of the examination object are acquired over a period of time, and an artifact parameter is established, which characterizes artifacts that occur as a result of breathing of the examination object during the period of time. The medical imaging data are displayed on a display screen together with a depiction of the artifact parameter.

11 Claims, 4 Drawing Sheets

(56) References Cited

U.S. PATENT DOCUMENTS

| | | |
|---|---|---|
| 2016/0003928 A1 | 1/2016 | Chen et al. |
| 2016/0275704 A1* | 9/2016 | Ertel .................... G06T 11/005 |
| 2016/0367142 A1* | 12/2016 | Hardie ................ A61B 5/0046 |
| 2017/0084059 A1* | 3/2017 | Hagiwara ............. G06T 11/008 |
| 2017/0238877 A1* | 8/2017 | Hsiao .................. A61B 3/1233 |

* cited by examiner

METHOD AND APPARATUS FOR DEPICTION OF MEDICAL IMAGE DATA

BACKGROUND OF THE INVENTION

Field of the Invention

The present invention concerns a method for depiction of medical imaging data, as well as a medical imaging apparatus and a non-transitory computer-readable storage medium that implements such a method.

Description of the Prior Art

Usually medical imaging data will be recorded by means of a medical imaging apparatus so as to represent anatomical structures and/or functional processes of the body of an examination object. The examination object can be a patient, a healthy test subject, an animal or a phantom.

During the acquisition of the medical imaging data, breathing movement of the examination object usually occurs. This breathing of the examination object leads to a movement of the examination object and therefore can lead to an undesired alteration of the acquired medical imaging data. For example, it is possible for movement artifacts to occur in the acquired medical imaging data. The quality of the acquired medical imaging data also can be reduced by the movement. Known image artifacts in the example of computed tomography imaging here are a blurring of the acquired image data as a result of the movement of the anatomy of the examination object. An irregularity in the breathing of the examination object also can lead to artifacts in the medical imaging data.

Taking account of the breathing of the examination object is of great importance during the acquisition of a time series consisting of medical imaging data, for example four-dimensional (4D) computed tomography image data or magnetic resonance image data. The importance is further increased if the computed tomography image data or the magnetic resonance image data are to be used for the planning of irradiation of the examination object by a radiation therapy device.

The practice of correlating the acquisition of the time series of the medical imaging data with the breathing of an examination object is known in such cases. This enables different image datasets of the time series of the medical imaging data to be acquired at specific points in time during an average breathing cycle of the examination object. The specific points in time in such cases can be selected on the basis of an amplitude and/or an elapsed time and/or a phase of the breathing cycle of the examination object.

SUMMARY OF THE INVENTION

An object of the invention is to make it possible to present medical imaging data in an enhanced manner.

The inventive method for depiction of medical imaging data of an examination object includes the following method steps. Medical imaging data of the examination object are acquired over a period of time. An artifact parameter is established that characterizes artifacts that occur because of breathing of the examination object during the period of time. The medical imaging data are displayed on a display screen together with a depiction of the artifact parameter.

The medical imaging data can represent an individual three-dimensional image dataset or a time series composed of a number of three-dimensional image datasets. The time series of the medical imaging data in such cases can also be seen as a four-dimensional image dataset, wherein the four dimensions are composed of three space dimensions and one time dimension. The acquisition of the medical imaging data can extend over a number of breathing cycles of the examination object.

The artifact parameter can be derived from the medical imaging data. The artifact parameter can then be obtained by a computing algorithm, which has the medical imaging data as its input parameter. As an alternative or in addition, the artifact parameter can be recorded in addition to the medical imaging data during the acquisition of the medical imaging data, for example by an external device or accessory device of the medical imaging apparatus. The artifact parameter can be dependent on the timing of a breathing movement of the examination object during the acquisition of the medical imaging data. Thus the artifact parameter can be dependent on a breathing phase and/or a breathing amplitude or a timing curve of the breathing phase and/or the breathing amplitude of the examination object during the acquisition of the medical imaging data.

The artifact parameter can be a quantification of the image artifacts that occur in the medical imaging data. In this sense the artifact parameter can represent an artifact metric. The artifact parameter can be time-resolved and/or spatially-resolved. Thus the artifact parameter can describe a temporal and/or spatial distribution of the strength of the image artifacts in the medical imaging data.

The display of the medical imaging data and the depiction of the artifact parameter takes place on the same display screen, for example on the same monitor. The medical imaging data and the depiction of the artifact parameter can in such cases be displayed in different windows or in the same window, preferably overlaid. The artifact parameter can be shown color-coded or intensity-coded in such cases. The artifact parameter also can be shown as a curve that specifies the dependency of the strength of the image artifacts with respect to a spatial coordinate and/or a time coordinate. Other possibilities for showing the artifact parameter that are considered reasonable to those skilled in the art are also conceivable. The depiction of the artifact parameter can be shown with a direct relationship to the respective medical imaging data for which the artifact parameter has been established.

Preferably a quality control of the acquired medical imaging data can be carried out using the described method. The quality control can be an assessment of the presence or of the strength of image artifacts in the medical imaging data. On the basis of the quality control, a decision can be made as to whether the acquired medical imaging data is suitable for further image processing or for making a diagnosis, for example. The quality control made possible by the inventive method can allow both a quantitative as well as a qualitative evaluation of the image artifacts in the medical imaging data. The display of the depiction of the artifact parameter can also include, in specific application cases, the overlaying of an artifact metric over the displayed medical imaging data, which advantageously allows a quantitative assessment of the presence or the strength of the image artifacts.

The display of the depiction of the artifact parameter achieves improved quality control compared to a pure visual inspection of the medical imaging data. For example, based on the depiction of the artifact parameter, a viewer of the medical imaging data can immediately be given an overview of possibly problematic breathing cycles of the examination object. It is also possible for the user to be given direct information in the display of the medical imaging data as to which image region of the medical imaging data is possibly critical in relation to breathing of the examination object that has taken place during the acquisition of the image region.

In specific application cases, in addition to the display of the depiction of the artifact parameter, there can also be a visual inspection of the medical imaging data. A so-called cine-loop can be employed here for visual inspection. When the medical imaging data are to be used for the planning of an irradiation, then possible changes in the shape and/or the size of the target tumor and of organs at risk can be inspected in different breathing phases of the examination object, for example. For the visual inspection, various contours can be drawn around the target tumor and/or the organs at risk so that a change to the contours over time can be investigated.

In an embodiment, a breathing curve of the examination object is recorded during the aforementioned period of time, and the artifact parameter is established on the basis of the recorded breathing curve.

The breathing curve can be acquired by using an accessory device of the medical imaging apparatus. Such an accessory device can be, for example, a respiration belt applied to the examination object, an optical sensor, a spirometer, a marking element or a Hooke sensor. A combination of elements or techniques that are considered reasonable to those skilled in the art can be employed for acquiring the breathing curve. As an alternative or in addition, the breathing curve can also be determined using the medical imaging data and/or using measurement data acquired in addition to the medical imaging data, for example magnetic resonance navigator measurement data. It is also conceivable for the breathing curve to be derived from the medical imaging data.

The breathing curve specifies a time sequence of the breathing of the examination object, especially a breathing amplitude, over the period of time. The breathing curve can be recorded over only a part of the period of time or over a larger time range than the period of time. The breathing curve can represent an especially advantageous basis for establishing the artifact parameter, since the image artifacts occurring in the medical imaging data are frequently associated with a frequency and/or the strength and/or the breathing pattern of the examination object.

In another embodiment, the establishment of the artifact parameter is an identification of an irregularity in the breathing of the examination object that is present in the period of time with reference to the breathing curve.

In this way an area in the breathing curve can be identified in which the breathing of the examination object can lead to uncertainties in the simultaneously acquired medical imaging data. The irregularity in the breathing of the examination object, for example, can have one of the following features: a markedly strong or weak breathing, a halt in the breathing for a time window during the period, an increase or reduction in the breathing frequency, a change in a breathing pattern.

The irregularity or abnormality in the breathing of the examination object can be established using the breathing curve by various methods. The irregularity can be identified manually, for example. An automatic or semi-automatic identification is also conceivable, for example with a peak detection algorithm, a pattern recognition algorithm or an analysis of the timing curve of the breathing frequency. For example, an investigation of a time sequence of an amplitude and/or phase of the breathing curve can be used for identification of the irregularity. Also, parts of the breathing curve can be compared with other parts with respect to specific features, such as the amplitude and/or phase, in order to identify the irregularity.

The identification of the irregularity can advantageously be used to identify that time window in the acquisition period in which the acquired image data, as a result of the occurring irregularity in the breathing, are more likely to contain artifacts. The display of the breathing curve, described in more detail in the following sections, in which the identified irregularity is plotted, can be advantageous.

In one embodiment, the identified irregularity in the breathing of the examination object is determined to occur during a time window in the period of time. During this time window, a spatial sub-region of the medical imaging data will be acquired, and the depiction of the artifact parameter will be shown spatially related to the first spatial sub-region of the medical imaging data.

The time window is shorter than the period of time, and can in some cases be so small as an individual point in time. With a successive recording of the medical imaging data, the spatial sub-region can be, for example, a number of adjacent slices. This is particularly the case for computed tomography imaging, in which the medical imaging data will be acquired consecutively from axially arranged slices. Each slice can be given a time stamp, so that the spatial sub-region of the medical imaging data that will be acquired during the time window can be deduced especially easily from the time window. Another type of temporal and spatial correlation, other than the allocation of acquired slices to individual points in time, is also conceivable.

The presentation of the artifact parameter in a spatial relationship to the spatial sub-region of the medical imaging data can be that the first spatial sub-region of the medical imaging data is shown highlighted. If the artifact parameter is shown in the form of a curve, then marked maxima of the curve can be shown in a spatial relationship to the spatial sub-region of the medical imaging data, for example overlaid or directly alongside the spatial sub-region.

In another embodiment, the artifact parameter is established on the basis of the acquired medical imaging data.

In this embodiment, the artifact parameter represents an image-based artifact metric. The artifact parameter in this way can be established by a recognition of image artifacts in the medical imaging data. As described in greater detail below, the artifact parameter can be established on the basis of an image comparison between contiguous part areas of the medical imaging data. With this method embodiment, a separate measurement for determining the artifact parameter is advantageously dispensed with.

In another embodiment, the aforementioned sub-region is a first spatial sub-region, and the artifact parameter is established on the basis of an image comparison between a second spatial sub-region of the medical imaging data and a third spatial sub-region of the medical imaging data. The third spatial sub-region is acquired in time following the second spatial sub-region during the period of time.

The third spatial sub-region will be acquired directly following on in time from the second spatial sub-region. The second and third spatial sub-regions in this case can be spatially neighboring, or can spatially adjoin each other directly. Thus it is possible for the second and third spatial sub-regions to represent neighboring slices or slice groups of the medical imaging data.

The artifact parameter can be determined in this case by an algorithm, which has as its input parameters the second spatial sub-region and the third spatial sub-region. A measure of a similarity between the second and third spatial sub-regions established in the image comparison can subsequently be set as the artifact parameter. Depending on the particular case, a low or a high similarity between the second and third spatial sub-regions can indicate a high probability of an occurrence of image artifacts.

The artifact parameter in this way can also be determined spatially-resolved, by a number of image comparisons being carried out. Overall image comparison offers an especially simple possibility for determining the artifact parameter.

In another embodiment, a breathing curve of the examination object is recorded during the period of time, the display of the depiction of the artifact parameter is a display of a depiction of the recorded breathing curve.

The breathing curve can be displayed with a spatial relationship to the medical imaging data. In this way the breathing curve can be displayed suitably overlaid in relation to the medical imaging data and/or directly alongside the medical imaging data. It is also conceivable for the breathing curve to be displayed alternately to the medical imaging data. Advantageously the recorded breathing curve is displayed in a spatial relationship to the medical imaging data, such that a time range of the breathing curve will be displayed directly above one another or next to one another in relation to the medical imaging data acquired during the time range.

In another embodiment, a selection of a second time window in the depiction of the breathing curve is made by a user, and a fourth spatial sub-region of the medical imaging data, which was acquired during the second time window, is highlighted on the display unit dependent on the selected second time window.

In this way, medical imaging data corresponding to a time window of the breath can be highlighted especially advantageously. The time window in this case can be a very short period of time or a point in time. This functionality makes it possible for the observer to easily identify that sub-region of the medical imaging data that has been acquired during a specific time window in the breathing curve. In this way the user can easily visually assess the possible effect that a specific event in the breathing of the patient, for example a change of breathing pattern, has on the medical imaging data.

In another embodiment, a third time window, during which a fifth spatial sub-region of the medical imaging data has been acquired, to be highlighted in the depiction of the breathing curve on the basis of a selection of the fifth spatial sub-region of the medical imaging data by a user.

This embodiment represents the converse of the previous embodiment. In this way the user can advantageously find the time window in the breathing curve corresponding to a specific sub-region in the medical imaging data especially quickly. This enables the user to establish especially quickly whether an irregularity in the breathing of the examination object may be responsible for a specific change in the medical imaging data, for example.

In another embodiment, the artifact parameter to be depicted on the display screen in the form of a curve overlaid on the medical imaging data, which represents the probability of the occurrence of artifacts at the respective point in the medical imaging data. In a further version of this embodiment, the artifact parameter is presented on the display screen in the form of a color coding and/or intensity coding overlaid on the medical imaging data, with the color coding and/or the intensity coding representing the probability of the occurrence of artifacts at the respective point in the medical imaging data.

These types of depiction of the artifact parameter allow a direct assessment to be made as to whether a specific image region in the medical imaging data exhibits a high probability of image artifacts. The described possibilities of depicting the artifact parameter can be combined with the various described embodiments for determining the artifact parameter.

The previously described individual embodiments for establishing and/or displaying the artifact parameter can also be employed in combinations, in order to achieve an even more robust assessment of the image artifacts.

The inventive medical imaging apparatus has a control computer that is configured to operate the medical imaging apparatus in order to implement the inventive method.

In this way the medical imaging apparatus is designed to carrying out the inventive method for depiction of medical imaging data of an examination object. A raw image data acquisition unit (scanner) of the medical imaging apparatus is operated to acquire raw medical imaging data of the examination object over a period of time. The raw data are transformed in a known manner into image data, which may contain artifacts. An establishment processor of the medical imaging apparatus is configured to establish an artifact parameter, which characterizes artifacts in the image data that occur as a result of breathing of the examination object during the period of time. At a display monitor of the medical imaging apparatus, the control computer is configured to display the medical imaging data on a display screen together with a depiction of the artifact parameter.

A non-transitory, computer-readable data storage medium is loaded directly into a memory of a programmable computer of a medical imaging apparatus and has program code that causes the inventive method to be implemented when the program code is executed in the computer of the medical imaging apparatus. This enables the inventive method to be carried out quickly, identically repeatably and robustly. The computer in this case must have certain prerequisites, such as a main memory and a graphics card or a logic unit, so that the respective method steps can be carried out efficiently.

Examples for electronically-readable data media are a DVD, a magnetic tape, a hard disk or s USB stick, on which electronically-readable control information, in particular software (cf. above), is stored.

The advantages of the inventive medical imaging apparatus and the inventive storage medium essentially correspond to the advantages of the inventive method, which have been set out in detail above. Features, advantages, and alternate embodiments mentioned above are likewise applicable to the other aspects of the invention. The functional features of the method will be embodied in such case by corresponding physical modules, in particular by hardware modules.

DESCRIPTION OF THE PREFERRED EMBODIMENTS

Figure 1:
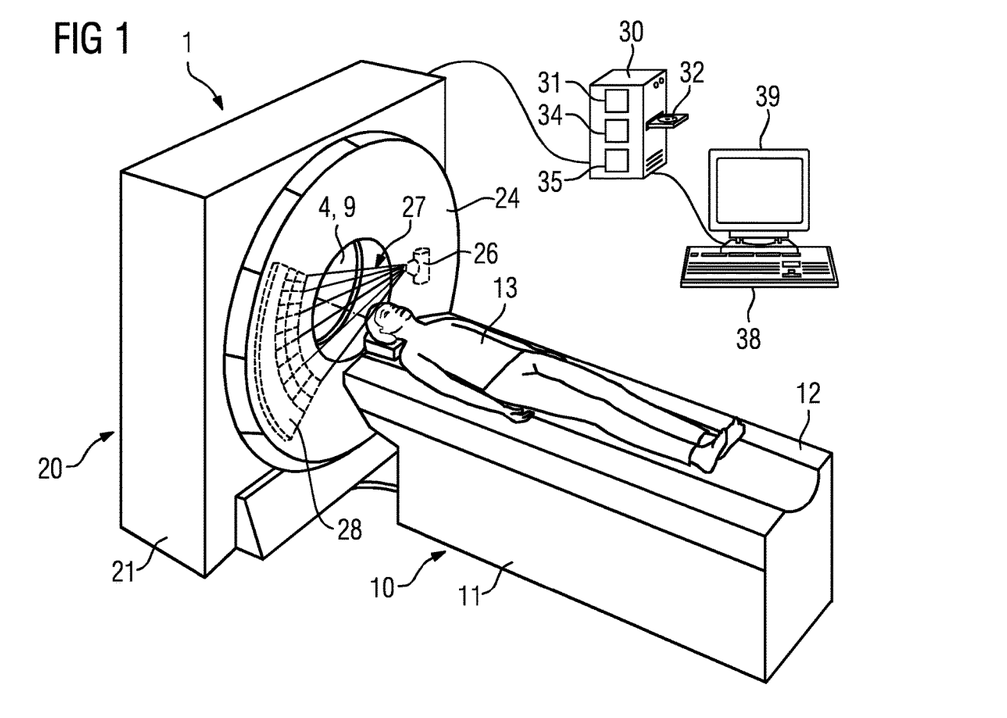
FIG. 1 shows an inventive medical imaging apparatus.

FIG. 1 shows an inventive medical imaging apparatus 1. The medical imaging apparatus 1 can be, for example, a magnetic resonance device, a Single Photon Emission Computed Tomography device (SPECT device), a Positron Emission Tomography device (PET device), a computed tomography device, an ultrasound device, an x-ray device or a C-arm device. The combined medical imaging apparatus 1 may also be any combination of a number of these imaging modalities. Without restricting the general inventive idea, the medical imaging apparatus 1 is shown as an example as a computed tomography apparatus.

The computed tomography apparatus has a gantry 20 with a tunnel-shaped opening 9, a patient support 10 and a control computer 30.

The gantry 20 forms the raw data acquisition scanner in this example, and has a stationary carrier frame 21 and a rotor 24. The rotor 24 is arranged in the stationary carrier frame 21 and is able to be rotated by a rotational support mount around an axis of rotation relative to the stationary carrier frame 21. An examination object 13 is able to be introduced into the tunnel-shaped opening 9. An acquisition area 4 is located in the tunnel-shaped opening 9. A region of the examination object 13 to be imaged is able to be positioned in the acquisition area 4 such that x-ray radiation 27 proceeds from a radiation source 26 to the region to be imaged, and after interaction with the region to be imaged, arrives at a radiation detector 28. The patient support 10 has support table 11 and a transfer plate 12 to support the examination object 13. The transfer plate 12 is arranged movably on the support table 11 such that, in a longitudinal direction of the transfer plate 12, the transfer plate 12 is able to be introduced into the acquisition area 4.

The computed tomography apparatus is designed for acquisition of projection data based on x-ray radiation 27. The computed tomography apparatus has a projection data acquisition unit with the radiation source 26, in particular an x-ray radiation source, and the detector 28, for example an x-ray detector, in particular an energy-resolving x-ray detector. The radiation source 26 is arranged on the rotor 24 and emits radiation, in particular x-ray radiation 27. The detector 28 is arranged on the rotor 24 and detects x-ray quanta in the radiation from the radiation source 26 that has passed through the region of the examination object 13 to be imaged and interacted with the region to be imaged. This attenuated radiation strikes the detector 28. In this way projection data of the region to be imaged are acquired by the raw data acquisition scanner.

The control computer 30 is configured to receive the projection data acquired by the acquisition scanner. The control computer 30 is configured to control the computed tomography apparatus. The control computer 30 has an image reconstruction processor 34. Medical imaging data are reconstructed by the image reconstruction device 34 based on the projection data, using a known reconstruction algorithm.

The computer 30 has a memory 31. A computer program (program code), stored on a non-transitory computer-readable storage medium 32, is able to be loaded into the memory 31 of the computer 30. The computer 30 executes the program.

The computed tomography apparatus has an input interface 38 and a display monitor 39, which are each connected to the control computer 30. The input interface 38 is designed for entering control information, e.g. image reconstruction parameters and/or examination parameters into the computer 30. The display monitor 39 is designed to display the medical imaging data at a display screen thereof.

The control computer 30 further includes an artifact parameter establishment processor 35. The display monitor 39 then caused to display the medical data together with a depiction of an artifact parameter, which will be established by the artifact parameter establishment processor 35.

Figure 2:
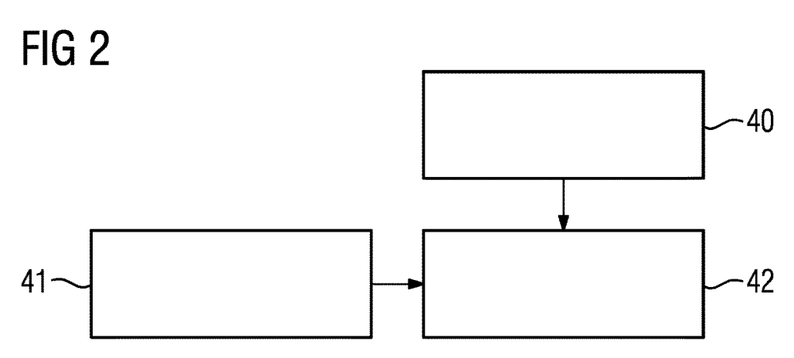
FIG. 2 is a flowchart of a first embodiment of the inventive method.

FIG. 2 shows a flowchart of a first embodiment of the inventive method for depiction of medical imaging data of an examination object 13.

In a first method step 40, there is an acquisition of medical imaging data of the examination object over a period of time by the projection data acquisition unit of the computed tomography apparatus and the image reconstruction processor 34.

In a further method step 41, an artifact parameter, which characterizes artifacts that occur as a result of breathing of the examination object during the period of time, is established by the artifact parameter establishment processor 35.

In a further method step 42, the medical imaging data are displayed on the display monitor 39 together with a depiction of the artifact parameter.

Figure 3:
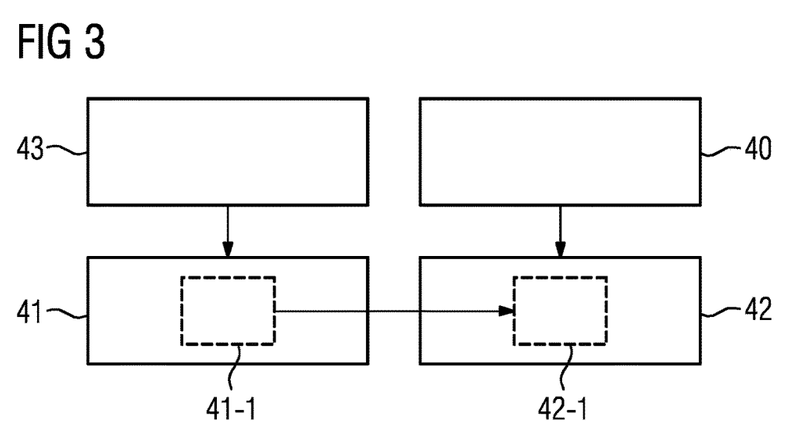
FIG. 3 is a flowchart of a second embodiment of the inventive method.
Figure 4:
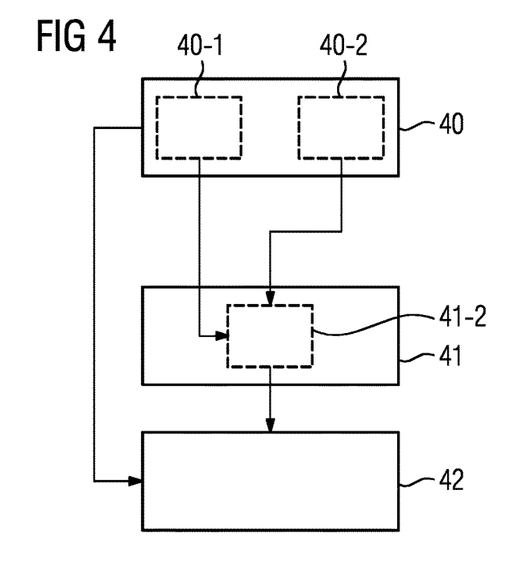
FIG. 4 is a flowchart of a third embodiment of the inventive method.
Figure 5:
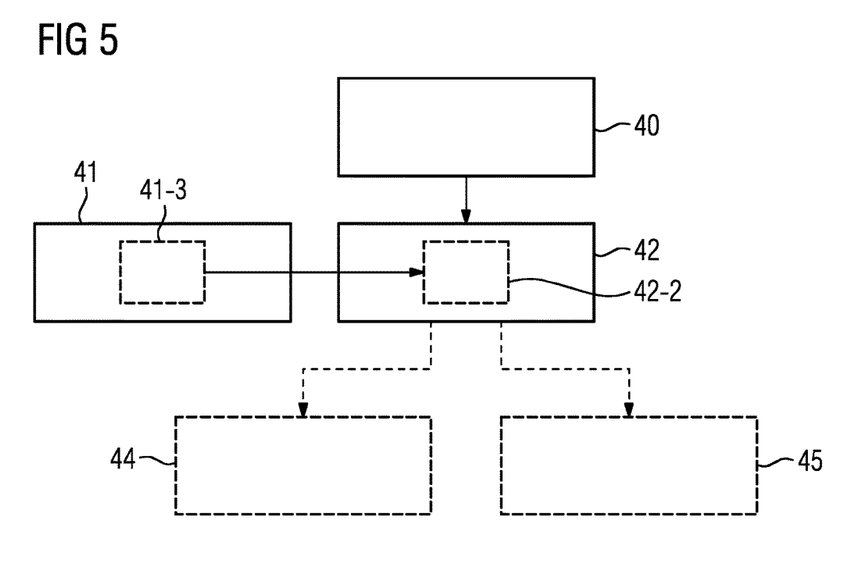
FIG. 5 is a flowchart of a fourth embodiment of the inventive method.

The description given below in FIG. 3-FIG. 5 is essentially restricted to differences from the exemplary embodiment in FIG. 2. For method steps that remain the same, the reference is made to the description of exemplary embodiment in FIG. 2. Method steps that essentially remain the same are basically labeled with the same reference characters.

The embodiments of the inventive method shown in FIG. 3-FIG. 5 essentially include the method steps 40, 41, 42 of the first embodiment of the inventive method in accordance with FIG. 2. The embodiments of the inventive method shown in FIG. 3-FIG. 5 include additional method steps and/or substeps. An alternate method execution sequence to that of FIG. 3-FIG. 5, which only has a part of the additional method steps and/or substeps shown in FIG. 3-FIG. 5 is also conceivable. Naturally an alternate method execution sequence to that of FIG. 3-FIG. 5 can also have additional method steps and/or substeps.

FIG. 3 shows a flowchart of a second form of embodiment of an inventive method for depiction of medical imaging data of an examination object 13.

In a further method step 43, a breathing curve of the examination object 15 is recorded during the period of time. In a sub-step 41-1 of the further method step 41 the artifact parameter is then established on the basis of the recorded breathing curve. The establishment of the artifact parameter can include an identification of an irregularity in the breathing of the examination object 15 that is present during the period of time with reference to the breathing curve.

The identified irregularity in the breathing of the examination object 15 occurs during a first time window in the period of time. During this first time window, a first spatial sub-region of the medical imaging data will be acquired. In a sub-step 42-1 of the further method step 42, the depiction of the artifact parameter can then be shown in a spatial relationship to the first spatial sub-region of the medical imaging data.

FIG. 4 shows a flowchart of a third embodiment of an inventive method for depiction of medical imaging data of an examination object 13.

In this embodiment the artifact parameter is established on the basis of the acquired medical imaging data. For this purpose, the first method step 40 includes a first sub-step 40-1, in which a second spatial sub-region of the medical imaging data will be acquired, and a second sub-step 40-2, in which a third spatial sub-region of the medical imaging data will be acquired. Here the third spatial sub-region will be acquired following in time after the second spatial sub-region during the period of time.

Then, in a sub-step 41-2 of the further method step 41, the artifact parameter is established on the basis of an image comparison between the second spatial sub-region of the medical imaging data and the third spatial sub-region of the medical imaging data.

FIG. 5 shows a flowchart of a fourth embodiment of an inventive method for depiction of medical imaging data of an examination object 13.

In a sub-step 41-3 of the further method step 41, a breathing curve of the examination object is recorded during the period of time. The display of the depiction of the artifact parameter in further method step 42 then includes, in a sub-step 42-2 of the further method step 42, a display of a depiction of the recorded breathing curve.

Then, in a further method step 44, with reference to a selection of a second time window in the depiction of the breathing curve by a user, a fourth spatial sub-region of the medical imaging data, which was acquired during the second time window, will be highlighted on the display monitor 39. Likewise, in a further method step 45 with reference to a selection of a fifth spatial sub-region of the medical imaging data by a user, a third time window, during which the fifth spatial sub-region of the medical imaging data was acquired, will be highlighted in the depiction of the breathing curve.

Figure 6:
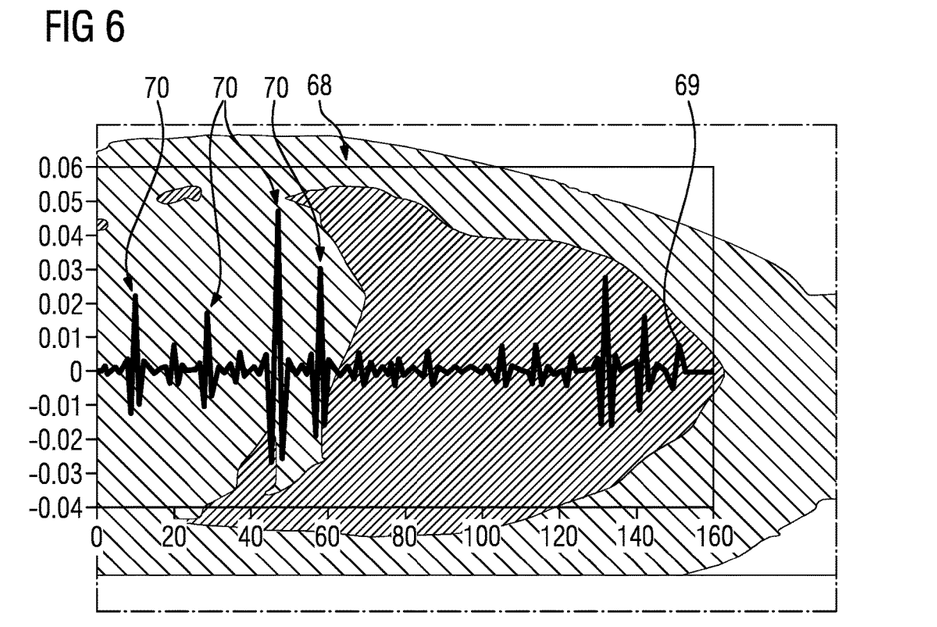
FIG. 6 shows an example of a display of the medical imaging data together with a depiction of the artifact parameter.

FIG. 6 shows an exemplary display of the medical imaging data 68 together with a depiction of the artifact parameter.

In the case shown in FIG. 6 the artifact parameter is depicted on the display monitor 39 in the form of a curve 69 overlaid on the medical imaging data 68, which represents the probability of an occurrence of artifacts at the respective point in the medical imaging data 68. As an alternative it is also conceivable for the curve 69 to be displayed directly alongside the medical imaging data 68.

On the curve 69 shown in FIG. 6, a strength of the artifacts or a probability of an occurrence of the artifacts is plotted in arbitrary units on the vertical axis. At highlighted points 70 here an especially high probability of artifacts is produced. Visible at the right highlighted points 70 is also a duplication and z-displacement of a diaphragm of the examination object 15, which represents an artifact. Drawn on the horizontal axis of the curve 69 is the spatial progress over the number of slices with the slice number specified.

The curve 69 shown can be derived, for example, directly from an acquired breathing curve of the examination object 15. The breathing curve can in this case be converted into spatial coordinates, by a point in time in the breathing curve being assigned to those spatial coordinates for which medical imaging data will be acquired during the point in time in the breathing curve. The curve 69 can naturally also be obtained in another way, for example directly from the medical imaging data.

The depiction of the artifact parameter shown in FIG. 6 is naturally only an example and those skilled in the art can employ other options that appear reasonable. For example, the depiction of the artifact parameter on the display unit can be made in the form of a color coding and/or intensity coding overlaid on the medical imaging data, with the color coding and/or intensity coding representing the probability of an occurrence of artifacts at the respective point in the medical imaging data.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A method for depicting medical image data of an examination object, comprising:
    operating a medical imaging apparatus to acquire medical image data of an examination subject over a period of time, and providing said medical image data to a computer;
    in said computer, deriving an artifact parameter from a source selected from the group consisting of said medical image data and a breathing curve recorded from the examination subject, said artifact parameter characterizing at least one artifact that occurs in said medical image data as a result of breathing of the examination subject during said period of time;
    in said computer, determining a probability of occurrence of said at least one artifact over said period of time, dependent on said breathing of the examination subject; and
    at a display screen in communication with said computer, displaying said medical image data with respect to said period of time overlaid with a depiction of said artifact parameter that represents said probability of occurrence of said at least one artifact over said period of time.

2. A method as claimed in claim 1 wherein said source is said breathing curve, and comprising deriving artifact parameter from said breathing curve by identifying an irregularity in said breathing of the examination object during said period of time.

3. A method as claimed in claim 2 comprising identifying said irregularity during a time window in said period of time, during which a spatial sub-region of said medical image data are acquired, and depicting said artifact parameter at said display screen in a spatial relationship to said spatial sub-region of said medical image data.

4. A method as claimed in claim 1 wherein said source is said medical image data, and comprising deriving said artifact parameter in said computer by making an image comparison between a first spatial sub-region of said medical image data and a second spatial sub-region of said medical image data, with image data in said second spatial sub-region being acquired after acquisition of image data in said first spatial sub-region.

5. A method as claimed in claim 3 comprising displaying the depiction of the artifact parameter at said display screen as a depiction of the recorded breathing curve.

6. A method as claimed in claim 5 comprising allowing manual interaction of a user with the breathing curve at said display screen to select a time window in the displayed breathing curve, in which a third spatial sub-region of the medical image data were acquired, and highlighting said third spatial sub-region of said medical image data on said display screen.

7. A method as claimed in claim 6 wherein said time window is a first time window, and comprising allowing further interaction of a user with said breathing curve at said display screen in order to select a select time window, during which a fourth spatial sub-region of said medical image data are acquired, and highlighting said second time window in the depiction of the breathing curve at said display screen.

8. A method as claimed in claim 1 comprising representing said depiction of said artifact parameter at said display screen as a curve representing said probability of an occurrence of said at least one artifact at respective points in said period of time.

9. A method as claimed in claim 1 comprising representing depiction of said at least one artifact parameter at said display screen as a coding, selected from the group consisting of color coding and intensity coding, overlaid on said medical image data, said coding representing said probability of occurrence of said at least one artifact at said respective point in said medical image data.

10. A medical imaging apparatus comprising:
- a control computer configured to operate said medical imaging scanner to acquire medical image data of an examination subject over a period of time, and providing said medical image data to a computer;
- said control computer being configured to derive an artifact parameter from a source selected from the group consisting of said medical image data and a breathing curve recorded from the examination subject, said artifact parameter characterizing at least one artifact that occurs in said medical image data as a result of breathing of the examination subject during said period of time;
- said control computer being configured to determine a probability of occurrence of said at least one artifact over said period of time, dependent on said breathing of the examination subject: and
- a display screen in communication with said control computer, said control computer being configured to display said medical image data (b) with respect to said period of time overlaid with a depiction of said artifact parameter at said display screen that represents said probability of occurrence of said at least one artifact over said period of time.

11. A non-transitory, computer-readable data storage medium encoded with programming instructions, said storage medium being loaded into a control computer of a medical imaging apparatus, said programming instructions causing said control computer to:
- operate the medical imaging apparatus to acquire medical image data of an examination subject over a period of time;
- derive an artifact parameter from a source selected from the group consisting of said medical image data and a breathing curve recorded from the examination subject, said artifact parameter characterizing at least one artifact that occurs in said medical image data as a result of breathing of the examination subject during said period of time from a source selected from the group consisting of said medical image data and a breathing curve recorded from the examination subject;
- determine a probability of occurrence of said at least one artifact over said period of time, dependent on said breathing of the examination subject; and
- at a display screen in communication with said control computer, display said medical image data with respect to said period of time overlaid with a depiction of said artifact parameter that represents said probability of occurrence of said at least one artifact over said period of time.

* * * * *